US012699558B2

(12) United States Patent
 Wakiguchi et al.

(10) Patent No.: US 12,699,558 B2
(45) Date of Patent: Aug. 4, 2026

(54) ELECTRONIC CONTROL DEVICE, REPROGRAM EXECUTION METHOD, AND NON-TRANSITORY COMPUTER READABLE STORAGE MEDIUM

(71) Applicants:DENSO CORPORATION, Kariya-city (JP); TOYOTA JIDOSHA KABUSHIKI KAISHA, Toyota (JP)

(72) Inventors: Kotaro Wakiguchi, Kariya-city (JP); Yuto Hirashima, Kariya-city (JP); Koji Hashimoto, Nagoya (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 553 days.

(21) Appl. No.: 18/340,930

(22) Filed: Jun. 26, 2023

(65) Prior Publication Data

US 2024/0004635 A1     Jan. 4, 2024

(30) Foreign Application Priority Data

Jun. 30, 2022     (JP) ................................. 2022-106143

(51) Int. Cl.
*G06F 8/65*     (2018.01)
*B60R 16/023*     (2006.01)

(52) U.S. Cl.
CPC ............ *G06F 8/65* (2013.01); *B60R 16/0231* (2013.01)

(58) Field of Classification Search
CPC ...... G06F 8/65; G06F 9/4401; B60R 16/0231
See application file for complete search history.

(56) References Cited

U.S. PATENT DOCUMENTS

| | | | | | |
|---|---|---|---|---|---|
| 7,107,482 | B2 * | 9/2006 | Murai | .................... | G01D 4/002 |
| | | | | | 714/E11.135 |
| 7,383,431 | B2 * | 6/2008 | Takamizawa | ............. | G06F 8/65 |
| | | | | | 713/2 |
| 9,760,461 | B2 * | 9/2017 | Nitta | .................... | G06F 11/2284 |
| 2021/0155173 | A1 | 5/2021 | Harata et al. | | |
| 2021/0155177 | A1 | 5/2021 | Harata et al. | | |
| 2021/0165649 | A1 * | 6/2021 | Harata | .................. | G06F 3/0679 |
| 2023/0153094 | A1 * | 5/2023 | Cain, Jr. | .................... | G06F 8/65 |
| | | | | | 717/168 |

FOREIGN PATENT DOCUMENTS

| | | |
|---|---|---|
| JP | 2020-027628 A | 2/2020 |
| JP | 2020-027638 A | 2/2020 |

* cited by examiner

*Primary Examiner* — Marina Lee
(74) *Attorney, Agent, or Firm* — Harness, Dickey & Pierce, P.L.C.

(57)     ABSTRACT

A control unit in an electronic control device includes: an activation mode information storage unit having a software area with a plurality of sides for storing software and activation mode information indicating whether a system is activated in a normal mode or a reprogram mode; and an activation side information storage unit storing activation side information indicating with which of the plurality of sides the system is activated in the normal mode. At least one of the activation mode information and the activation side information is updated according to a progress of reprogram. The system is activated based on the activation mode information and the activation side information.

8 Claims, 17 Drawing Sheets

FIG. 3

| STATUS | BOOT FLAG | REPROG SOFT FLAG | OPE AT RE-ACTIV OF SYS |
|---|---|---|---|
| ACTIVATE BY A-SIDE NORM SOFT | ON | OFF | ACTIVATE BY A-SIDE NORM SOFT |
| STILL REWRITING SIDE B WHILE ACTIVATING BY A-SIDE NORM SOFT | ON | OFF | ACTIVATE BY A-SIDE NORM SOFT |
| REWRITING OF SIDE B COMPLETED (SIDE A NOT AVAIL / SIDE B AVAIL) | OFF | OFF | ACTIVATE BY B-SIDE NORM SOFT |
| ACTIVATE BY B-SIDE NORM SOFT | OFF | OFF | ACTIVATE BY B-SIDE NORM SOFT |

FIG. 5

| STATUS | BOOT FLAG | REPROG SOFT FLAG | OPE AT RE-ACTIV OF SYS |
|---|---|---|---|
| ACTIVATE BY B-SIDE NORM SOFT | OFF | OFF | ACTIVATE BY B-SIDE NORM SOFT |
| STILL REWRITING SIDE A WHILE ACTIVATING BY B-SIDE NORM SOFT | OFF | OFF | ACTIVATE BY B-SIDE NORM SOFT |
| REWRITING OF SIDE A COMPLETED (SIDE B NOT AVAIL / SIDE A AVAIL) | ON | OFF | ACTIVATE BY A-SIDE NORM SOFT |
| ACTIVATE BY A-SIDE NORM SOFT | ON | OFF | ACTIVATE BY A-SIDE NORM SOFT |

FIG. 7

| STATUS | BOOT FLAG | REPROG SOFT FLAG | OPE AT RE-ACTIV OF SYS |
|---|---|---|---|
| ACTIVATE BY A-SIDE / B-SIDE NORM SOFT | ON / OFF | OFF | ACTIVATE BY A-SIDE / B-SIDE NORM SOFT |
| TRANS REQ TO REPROG MODE OCCUR WHILE ACTIVATING BY A-SIDE / B-SIDE NORM SOFT | ON / OFF | OFF | ACTIVATE BY A-SIDE / B-SIDE NORM SOFT |
| TRANS REQ TO REPROG MODE COMPLETED | ON / OFF | ON | ACTIVATE BY REPROG MODE SOFT |
| ACTIVATE BY REPROG MODE SOFT | ON / OFF | ON | ACTIVATE BY REPROG MODE SOFT |
| STILL REWRITING SIDE A / SIDE B WHILE ACTIVATING IN REPROG MODE | ON / OFF | ON | ACTIVATE BY REPROG MODE SOFT |
| REWRITING OF SIDE A / SIDE B COMPLETED | ON / OFF | OFF | ACTIVATE BY A-SIDE / B-SIDE NORM SOFT |
| ACTIVATE BY A-SIDE / B-SIDE NORM SOFT | ON / OFF | OFF | ACTIVATE BY A-SIDE / B-SIDE NORM SOFT |

FIG. 8

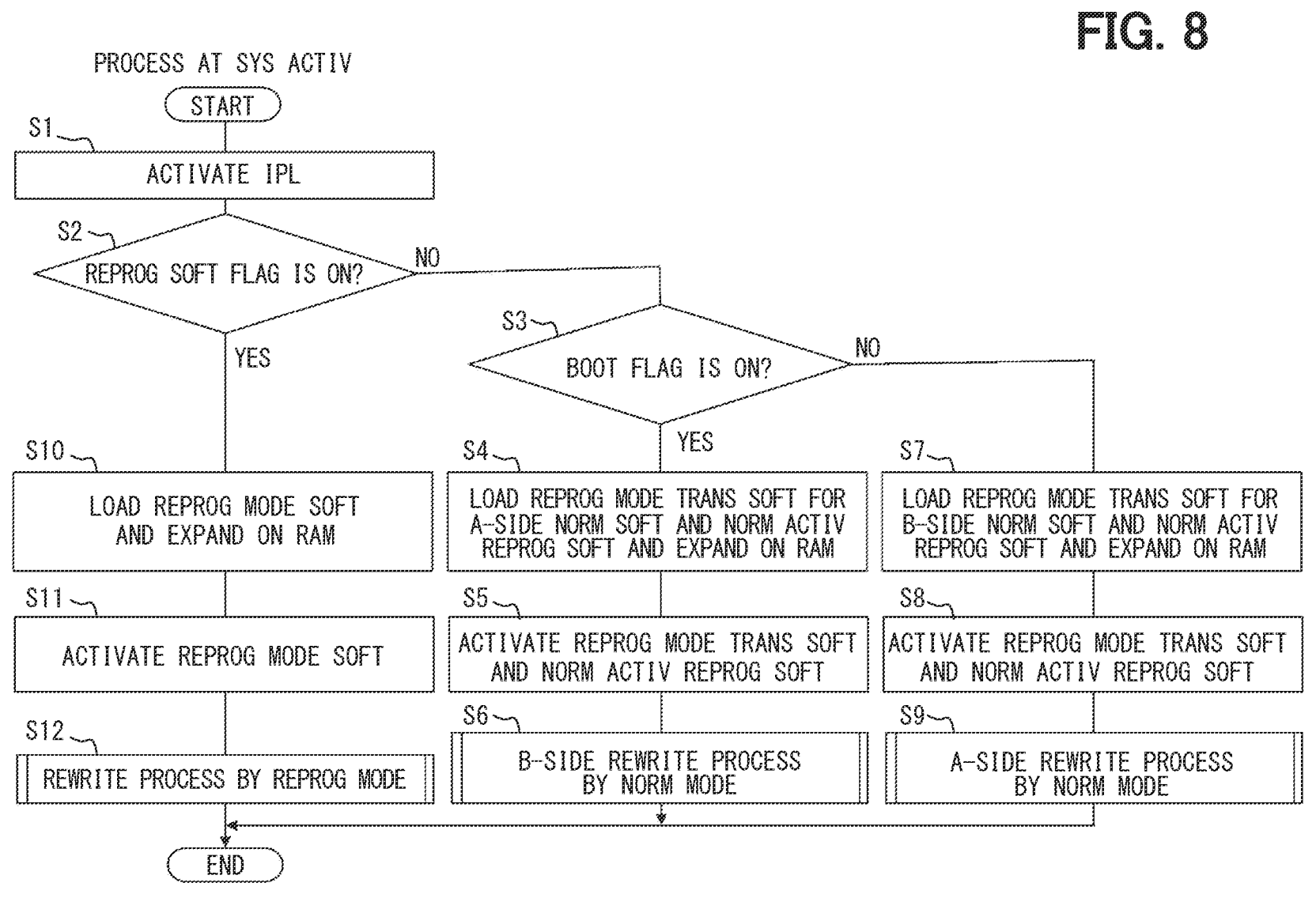

PROCESS AT SYS ACTIV

START

S1 — ACTIVATE IPL

S2 — REPROG SOFT FLAG IS ON?

NO →

YES ↓

S10 — LOAD REPROG MODE SOFT AND EXPAND ON RAM

S11 — ACTIVATE REPROG MODE SOFT

S12 — REWRITE PROCESS BY REPROG MODE

END

S3 — BOOT FLAG IS ON?

YES ↓

S4 — LOAD REPROG MODE TRANS SOFT FOR A-SIDE NORM SOFT AND NORM ACTIV REPROG SOFT AND EXPAND ON RAM

S5 — ACTIVATE REPROG MODE TRANS SOFT AND NORM ACTIV REPROG SOFT

S6 — B-SIDE REWRITE PROCESS BY NORM MODE

NO →

S7 — LOAD REPROG MODE TRANS SOFT FOR B-SIDE NORM SOFT AND NORM ACTIV REPROG SOFT AND EXPAND ON RAM

S8 — ACTIVATE REPROG MODE TRANS SOFT AND NORM ACTIV REPROG SOFT

S9 — A-SIDE REWRITE PROCESS BY NORM MODE

FIG. 13

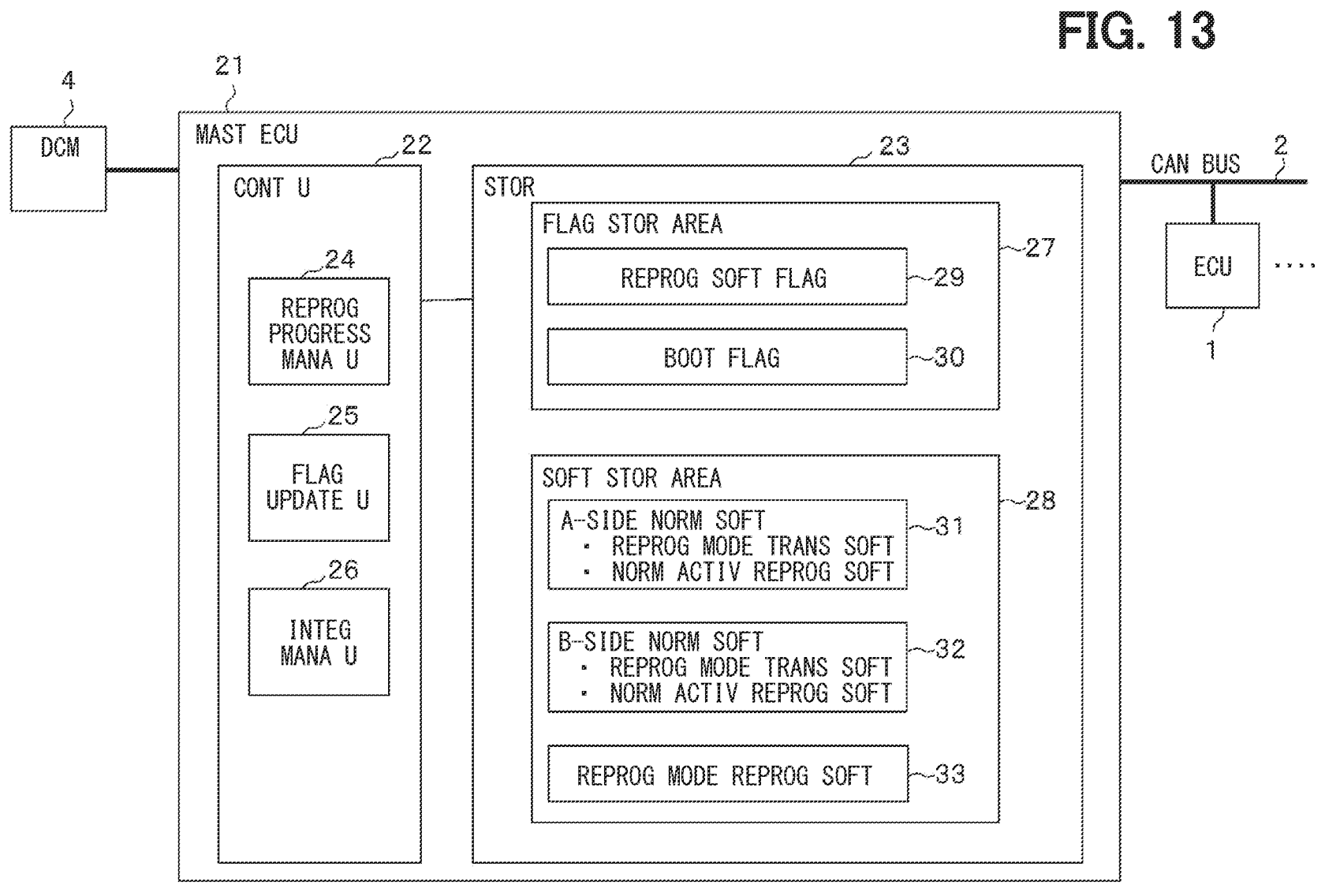

CAN BUS 2

ECU 1

DCM 4

MAST ECU 21

CONT U 22

REPROG PROGRESS MANA U 24

FLAG UPDATE U 25

INTEG MANA U 26

STOR 23

FLAG STOR AREA 27

REPROG SOFT FLAG 29

BOOT FLAG 30

SOFT STOR AREA 28

A-SIDE NORM SOFT 31
· REPROG MODE TRANS SOFT
· NORM ACTIV REPROG SOFT

B-SIDE NORM SOFT 32
· REPROG MODE TRANS SOFT
· NORM ACTIV REPROG SOFT

REPROG MODE REPROG SOFT 33

ELECTRONIC CONTROL DEVICE, REPROGRAM EXECUTION METHOD, AND NON-TRANSITORY COMPUTER READABLE STORAGE MEDIUM

CROSS REFERENCE TO RELATED APPLICATIONS

The present application claims the benefit of priority from Japanese Patent Application No. 2022-106143 filed on Jun. 30, 2022. The entire disclosure of the above application is incorporated herein by reference.

TECHNICAL FIELD

The present disclosure relates to an electronic control device, a reprogram execution method, and a non-transitory computer readable storage medium.

BACKGROUND

For example, an in-vehicle electronic control device (hereinafter referred to as an ECU, i.e., Electronic Control Unit) is configured so that software (hereinafter sometimes referred to as software) can be updated for the purpose of improving functions or fixing defects. Software update is also defined as reprogramming or repro. When the master ECU that manages the execution of reprogramming instructs the reprogram target ECU as the reprogramming target to write the update data, the update data is written in the software area to rewrites the software area. In this case, in a reprogram targeted ECU having a plurality of sides in a software area, it is possible to rewrite the non-operating side while vehicle control is being performed by the software of the operating side.

SUMMARY

According to an example, a control unit in an electronic control device may include: an activation mode information storage unit having a software area with a plurality of sides for storing software and activation mode information indicating whether a system is activated in a normal mode or a reprogram mode; and an activation side information storage unit storing activation side information indicating with which of the plurality of sides the system is activated in the normal mode. At least one of the activation mode information and the activation side information is updated according to a progress of reprogram. The system is activated based on the activation mode information and the activation side information.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram for explaining the updating of a boot flag;

FIG. 5 is a diagram for explaining the updating of a boot flag;

FIG. 7 is a diagram for explaining an updating of the reprogram software flag;

FIG. 8 is a flowchart showing processing at system activation;

FIG. 13 is a functional block diagram showing a modification of the first embodiment;

DETAILED DESCRIPTION

In a reprogram target ECU having a plurality of sides in the software area, if a power source failure occurs during reprogramming, a software version discrepancy may occur. If there is a software version discrepancy, the system may not be re-activated normally when the system is re-activated due to power source recovery.

The present embodiments have been made in view of the above circumstances, and its object is to provide an electronic control device, a reprogram execution method, and a reprogram execution program, for reactivating a system in a configuration having a plurality of sides of software area normally when reactivating the system due to a power source recovery even if the power source failure occurs during executing a reprogram process.

According to the first aspect of the embodiments, an activation mode information storage unit stores activation mode information indicating whether the system is activated in a normal mode or a reprogram mode when the system is activated. An activation side information storage unit stores activation side information indicating by which of a plurality of sides the system is activated when activating in the normal mode. A reprogram progress management unit manages the progress of the reprogram. An information updating unit updates at least one of the activation mode information and the activation side information according to the progress of the reprogramming. The reprogram progress management unit activates the system based on the activation mode information and the activation side information.

At least one of the activation mode information and the activation side information is updated according to the progress of the reprogramming, and the system is activated based on the activation mode information and the activation side information. Even if a power source failure occurs during the execution of the reprogramming, the system can be re-activated normally by referring to the activation mode information and the activation side information immediately before the power source failure when the system is reactivated due to the power source recovery. As a result, even if a power source failure occurs during the execution of the reprogramming, the system can be reactivated normally when the system is reactivated by the power source recovery.

Hereinafter, multiple embodiments will be described with reference to the drawings. In the embodiment to be described later, the description of the same parts as in the preceding embodiment is omitted.

First Embodiment

Figure 1:
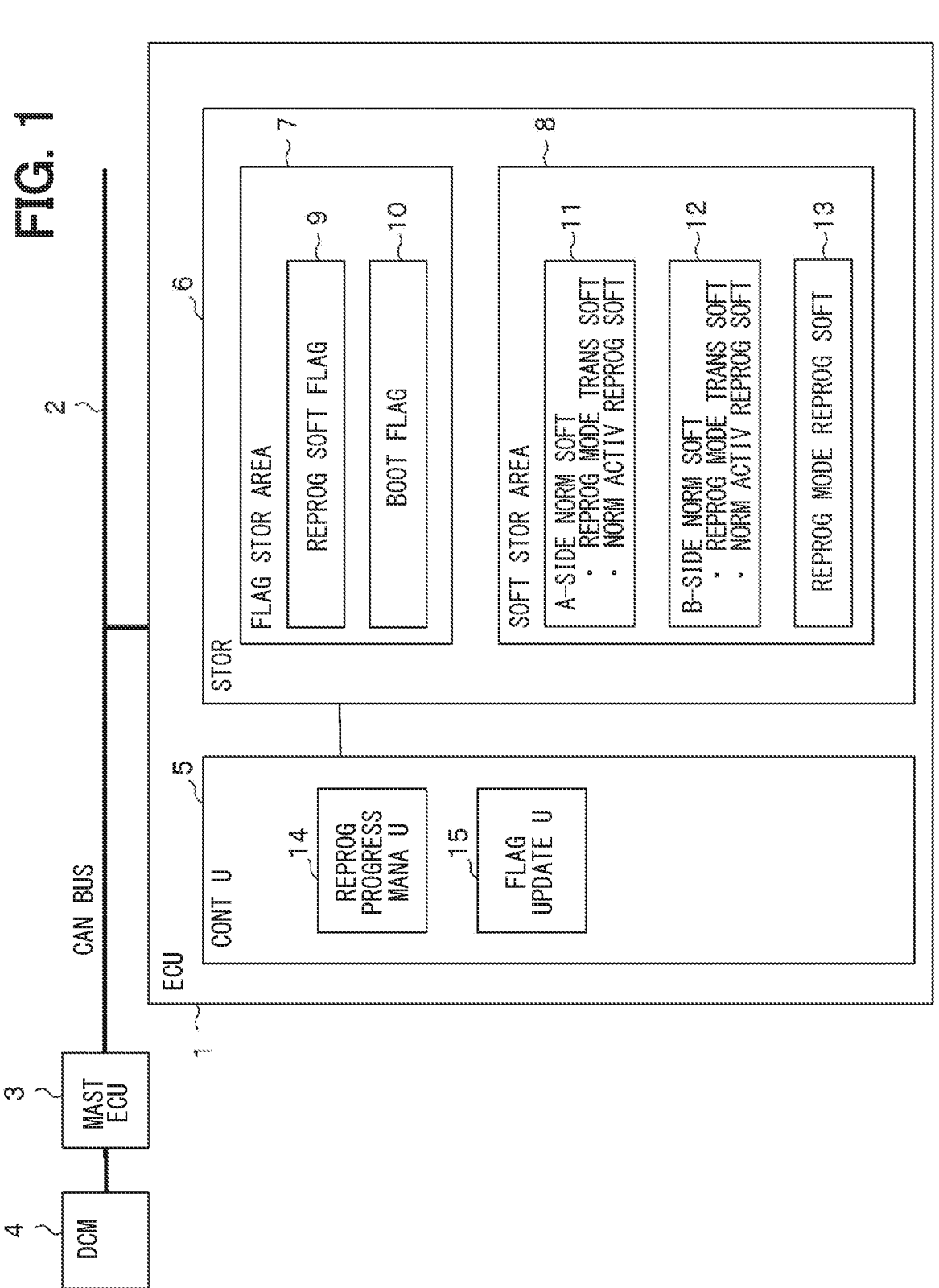
FIG. 1 is a functional block diagram according to a first embodiment.

A first embodiment will be described with reference to FIG. 1 to FIG. 13. As shown in FIG. 1, an ECU 1 mounted on a vehicle is connected to a master ECU 3 that manages execution of reprogramming via, for example, a CAN bus 2 (Controller Area Network bus, registered trademark) as a communication network. The master ECU 3 integrally manages the ECU 1 by issuing operation instructions to the ECU 1 and acquiring operation states from the ECU 1. The number of ECUs 1 connected to the master ECU 3 via the CAN bus 2 is arbitrary, and the master ECU 3 integrally manages an arbitrary number of ECUs 1. The ECUs 1 integrally managed by the master ECU 3 are, for example, a power train ECU, a body ECU, a cockpit ECU, a chassis ECU, a safety ECU, and the like.

The master ECU 3 is connected to a DCM (Data Communication Module) 4 functioning as a data communication device. The DCM 4 is wirelessly connected to an OTA center via a communication network so that a distribution package transmitted from the OTA center can be received. When receiving the distribution package transmitted from the OTA center, the DCM 4 transmits the received distribution package to the master ECU 3. When the delivery package is transmitted from the DCM 4, the master ECU 3 extracts update data from the transmitted delivery package and instructs the ECU 1 to write the extracted update data. When the master ECU 3 instructs the ECU 1 to write the update data, the ECU 1 writes the update data in the software area and rewrites the software area.

The communication network may be a communication network based on a communication standard such as Ethernet (registered trademark) or FlexRay (registered trademark), or a communication network not based on a specific communication standard. Also, the communication network connecting the DCM 4 and the master ECU 3 and the communication network connecting the master ECU 3 and the ECU 1 may be different types of communication networks. Furthermore, when a plurality of ECUs 1 are connected to the master ECU 3, the communication networks connecting the master ECU 3 and the plurality of ECUs 1 may be different types of communication networks.

The ECU 1 includes a control unit 5 and a storage 6 as a storage medium. The control unit 5 is provided by a microcomputer having a CPU (Central Process Unit), a ROM (Read Only Memory), a RAM (Random Access Memory), and an I-O (Input-Output). By executing a control program stored in a non-transitory tangible storage medium, the control unit 5 executes a process corresponding to the control program, and controls the overall operation of the ECU 1. The control program executed by the control unit 5 includes a reprogram execution program.

The storage 6 is a non-volatile memory mainly includes, for example, a NOR flash memory or a NAND flash memory. The storage 6 has a flag storage area 7 and a software storage area 8. The soft storage area 8 has a two-sided configuration having two storage areas, an A side and a B side.

The flag storage area 7 includes a reprogram software flag storage area 9 and a boot flag storage area 10. The reprogram software flag storage area 9 stores a reprogram software flag (corresponding to an activation mode information) indicating whether the normal mode or the reprogram mode is used when the system is activated. When the reprogram software flag is turned on, it indicates that the system will be activated in the reprogram mode, and when the reprogram software flag is turned off, it means that the system will be activated in the normal mode. The boot flag storage area 10 stores a boot flag (corresponding to an activation side information) indicating with which side of the A side or the B side the system is activated when the system is activated in the normal mode. When the boot flag is on, it indicates that the system will be activated with the A side, and when the boot flag is off, it indicates that the system will be activated with the B side.

The software storage area 8 includes an A-side normal software storage area 11, a B-side normal software storage area 12, and a reprogram mode reprogram software storage area 13. The A-side normal software storage area 11 and the B-side normal software storage area 12 store the A-side normal software and the B-side normal software that are activated in the normal mode, respectively. The A-side normal software and the B-side normal software include reprogram mode transition software and normal activation reprogram software, respectively. One of the A-side normal software storage area 11 and the B-side normal software storage area 12 can be rewritten while the ECU 1 is operating normally using the other of the A-side normal software storage area 11 and the B-side normal software storage area 12. That is, the B-side normal software can be rewritten while the ECU 1 is operating normally using the A-side normal software, and the A-side normal software can be rewritten while the ECU 1 is operating normally using the B-side normal software. The reprogram mode reprogram software storage area 13 stores reprogram mode reprogram software to be activated in the reprogram mode.

The control unit 5 includes a reprogram progress management unit 14 and a flag update unit 15 (corresponding to an information update unit). The reprogram progress management unit 14 reads a reprogram software flag and a boot flag from the storage 6 by an IPL (Initial Program Loader) when the ECU 1 is activated, and sends a load request to a software storage area 8 according to the on and off state (e.g., data value) of the read flag, and loads the necessary software from the software storage area 8. IPL is a program that is automatically loaded and executed when the system is activated. The flag update unit 15 updates the reprogram software flag and the boot flag according to the progress of reprogram. That is, the control unit 5 updates the reprogram software flag and the boot flag according to the progress of the reprogramming through cooperation between the reprogram progress management unit 14 and the flag update unit 15, and manages the progress of the reprogram. Description will be made below with reference to FIGS. 2 to 6.

Figure 2:
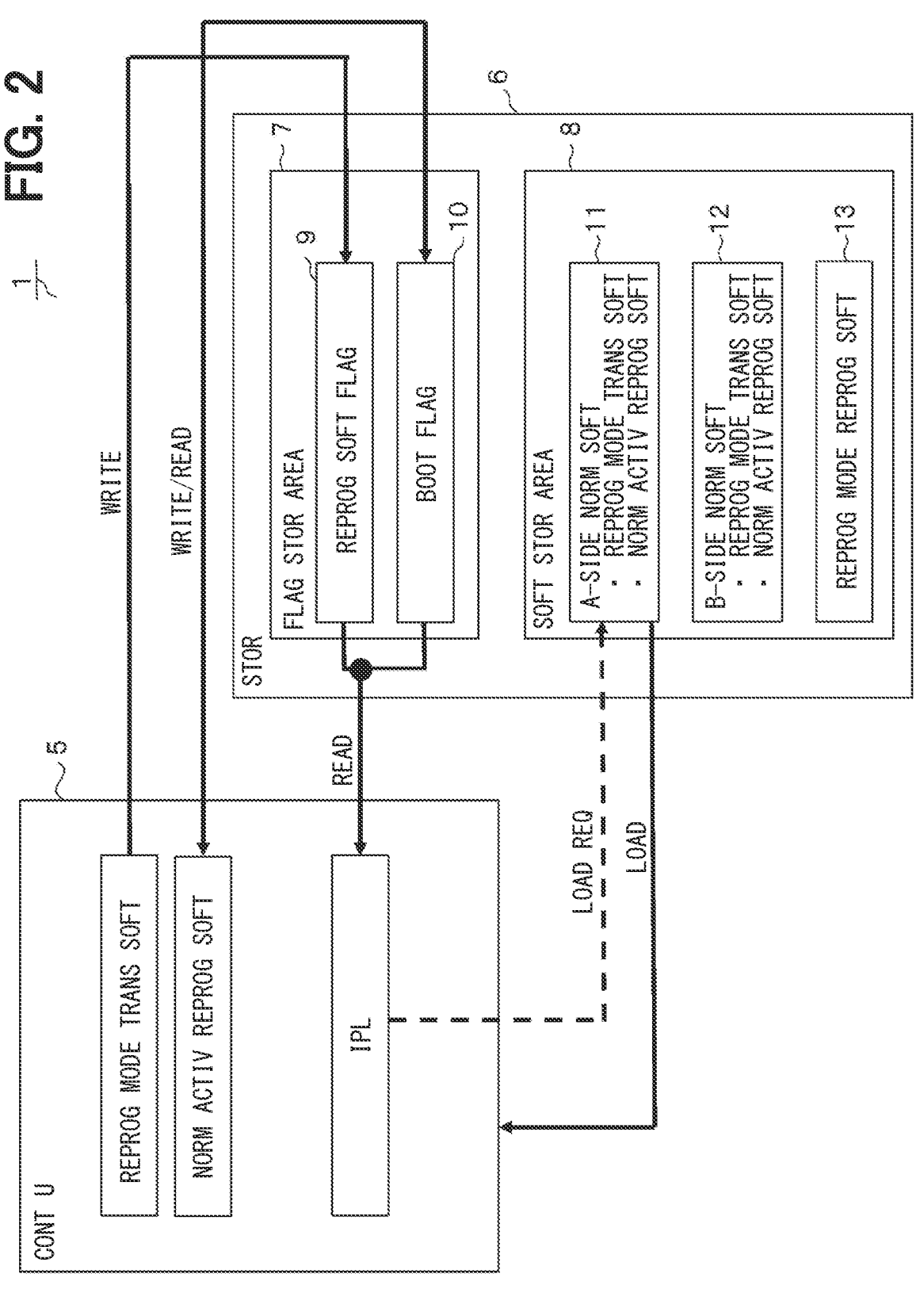
FIG. 2 is a diagram explaining an activation in a normal mode.

When the reprogram software flag is off and the boot flag is on, as shown in FIG. 2, the control unit 5 notifies the load request for the reprogram mode transition software and the normal activation reprogram software included in the A-side normal software to the storage 6, loads the reprogram mode transition software and the normal activation reprogram software included in the A-side normal software from the storage 6 to expand on the RAM, and activates with the A-side normal software. The control unit 5 executes the reprogram mode transition software expanded on the RAM to be capable of writing the reprogram software flag, and executes the normal activation reprogram software expanded on the RAM to be capable of reading and writing the boot flag.

When the system is activated with the A-side normal software for side, the control unit 5 updates the boot flag according to the progress of reprogram by the normal activation reprogram software, as shown in FIG. 3. The control unit 5 maintains the off state of the reprogram software flag and the on state of the boot flag until the rewriting of the B side is completed. When the rewriting of the B side is completed, the control unit 5 updates the boot flag from the on state to the off state, invalidates the A-side software, and validates the B-side software. After validating the B-side software, the control unit 5 activates the B-side normal software when the system is re-activated.

That is, the control unit 5 maintains the off state of the reprogram software flag and the on state of the boot flag until the rewriting of the B side is completed. Thus, for example, if the power source failure occurs while the B side is being rewritten and the system is re-activated due to the power source recovery, the system is activated with the A-side normal software. Alternatively, even if the difficulty occurs and the power source failure occurs during the system is being activated with the A-side normal software, the system is activated with the A-side normal software when re-activating the system due to the power source recovery. When the rewriting of the B side is completed, the control unit 5 updates the boot flag from the on state to the off state, invalidates the software of the A side, and validates the software of the B side. Thus, if a power failure occurs after completing the rewriting of the B side, and the system is re-activated due to the power source recovery, the system is activated with the B-side normal software. Alternatively, when the system is activated after the system is terminated normally, the system is activated with the B-side normal software.

Figure 4:
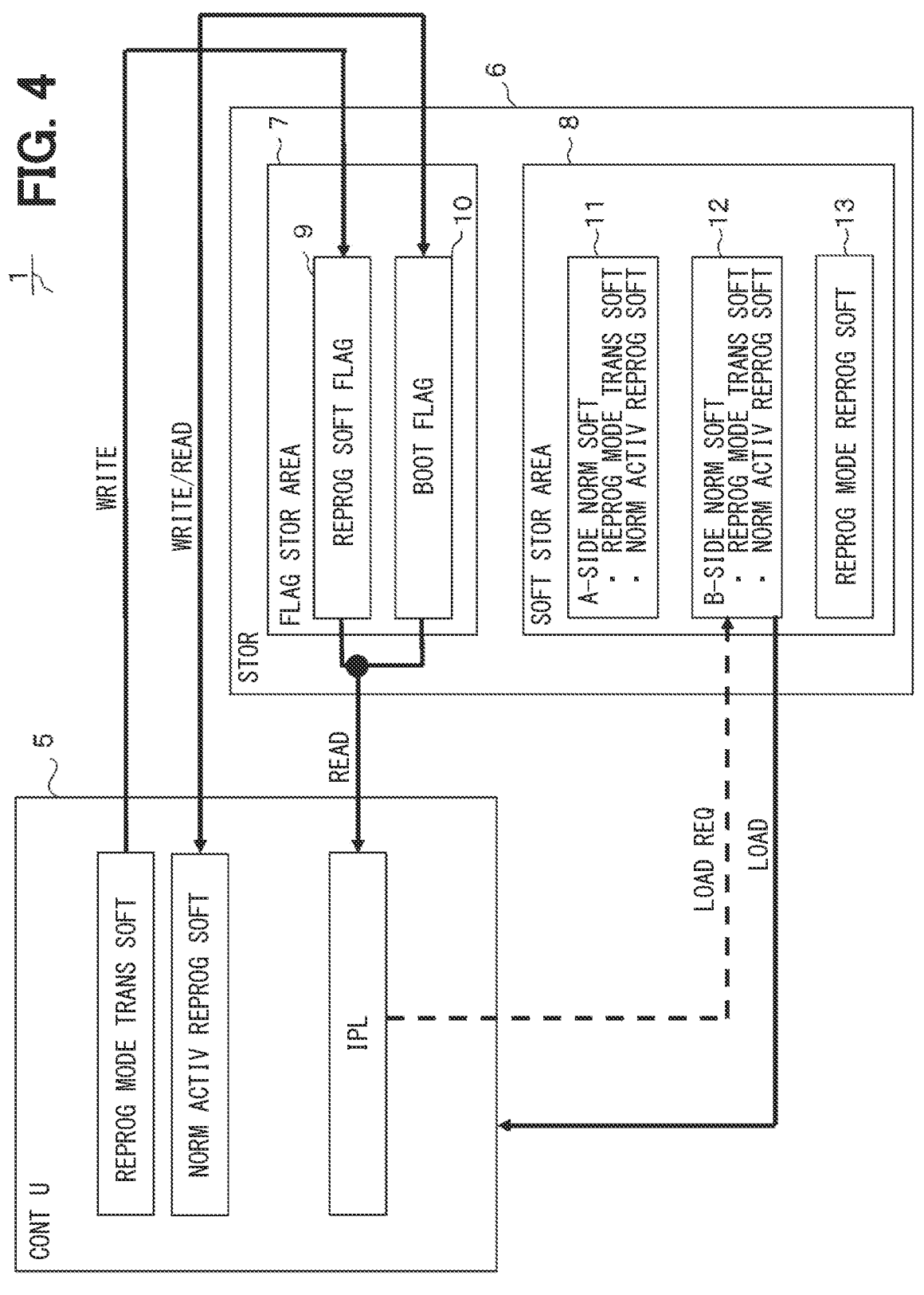
FIG. 4 is a diagram explaining an activation in a normal mode.

When the reprogram software flag is off and the boot flag is off, as shown in FIG. 4, the control unit 5 notifies the load request for the reprogram mode transition software and the normal activation reprogram software included in the B-side normal software to the storage 6, loads the reprogram mode transition software and the normal activation reprogram software included in the B-side normal software from the storage 6 to expand on the RAM, and activates with the B-side normal software. The control unit 5 executes the reprogram mode transition software expanded on the RAM to be capable of writing the reprogram software flag, and executes the normal activation reprogram software expanded on the RAM to be capable of reading and writing the boot flag.

When the system is activated with the B-side normal software for side, the control unit 5 updates the boot flag according to the progress of reprogram by the normal activation reprogram software, as shown in FIG. 5. The control unit 5 maintains the off state of the reprogram software flag and the off state of the boot flag until the rewriting of the Aside is completed. When the rewriting of the Aside is completed, the control unit 5 updates the boot flag from the off state to the on state, invalidates the B-side software, and validates the A-side software. After validating the A-side software, the control unit 5 activates the A-side normal software when the system is re-activated.

That is, the control unit 5 maintains the off state of the reprogram software flag and the off state of the boot flag until the rewriting of the A side is completed. Thus, for example, if the power source failure occurs during the A side is being rewritten and the system is re-activated due to the power source recovery, the system is activated with the B-side normal software. Alternatively, even if the difficulty occurs and the power source failure occurs during the system is being activated with the B-side normal software, the system is activated with the B-side normal software when re-activating the system due to the power source recovery. When the rewriting of the A side is completed, the control unit 5 updates the boot flag from the off state to the on state, invalidates the software of the B side, and validates the software of the A side. Thus, if a power failure occurs after completing the rewriting of the A side, and the system is re-activated due to the power source recovery, the system is activated with the A-side normal software. Alternatively, when the system is activated after the system is terminated normally, the system is activated with the A-side normal software.

Figure 6:
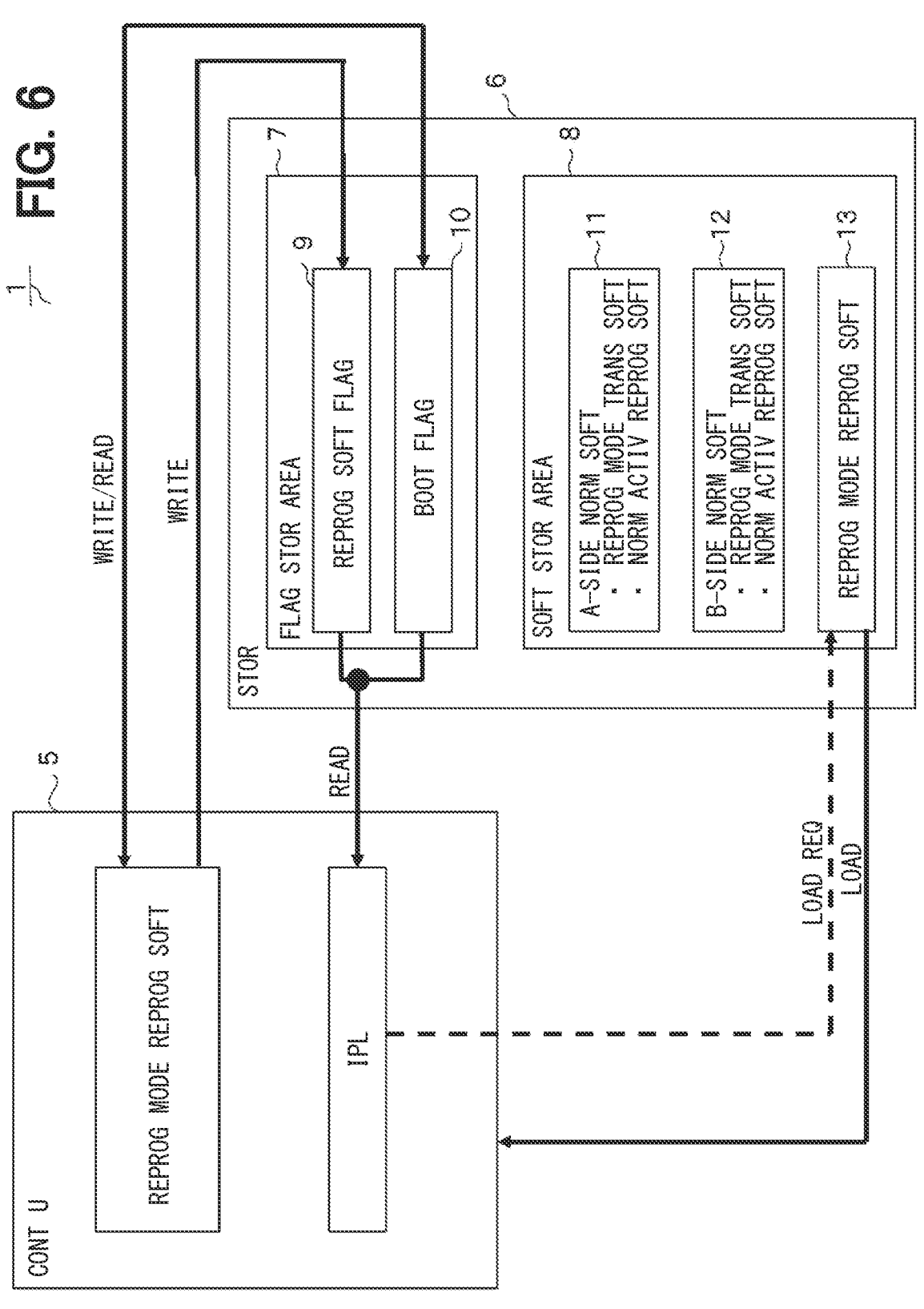
FIG. 6 is a diagram for explaining an activation in a reprogram mode.
Figure 9:
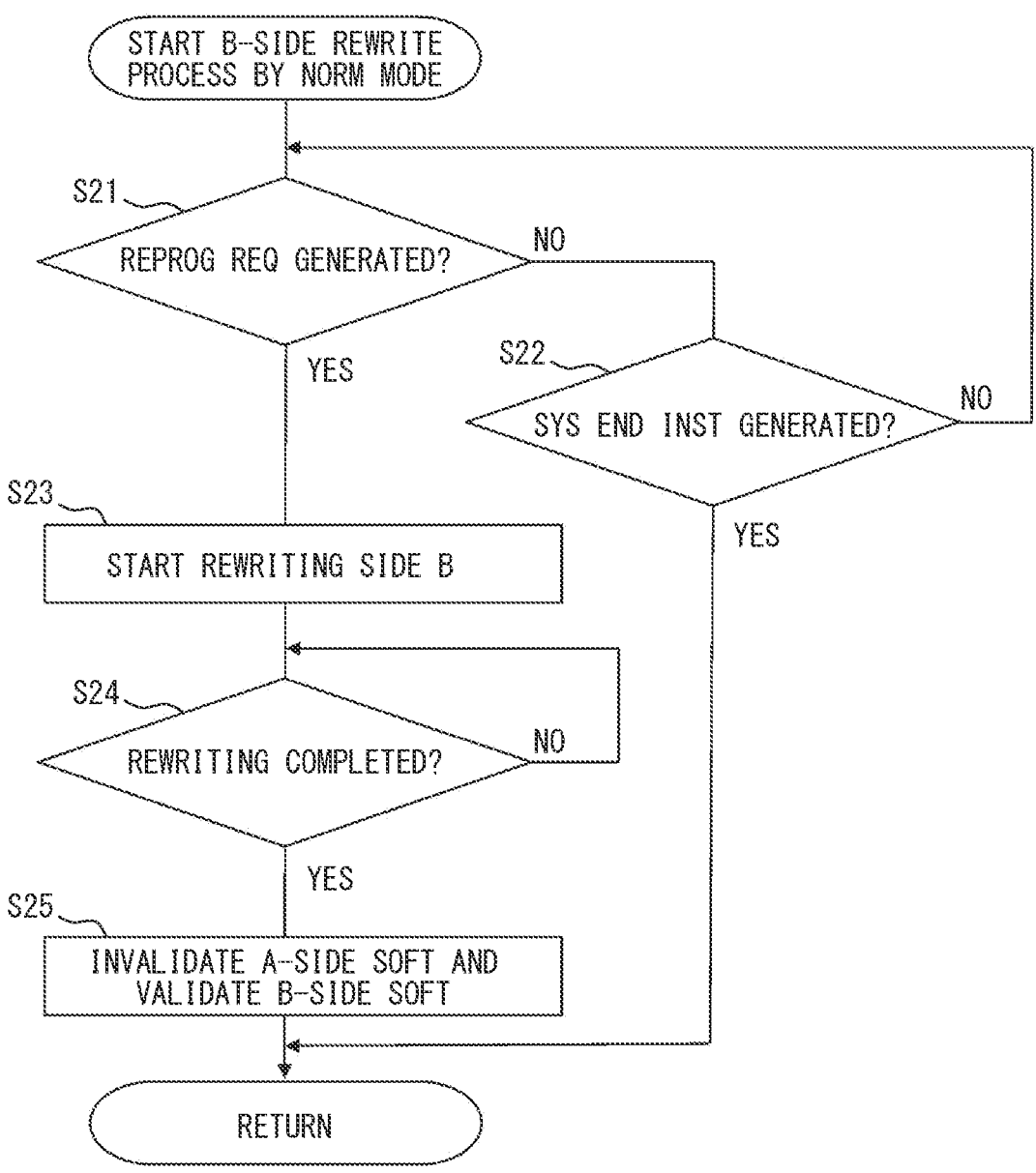
FIG. 9 is a flowchart showing processing at system activation.
Figure 10:
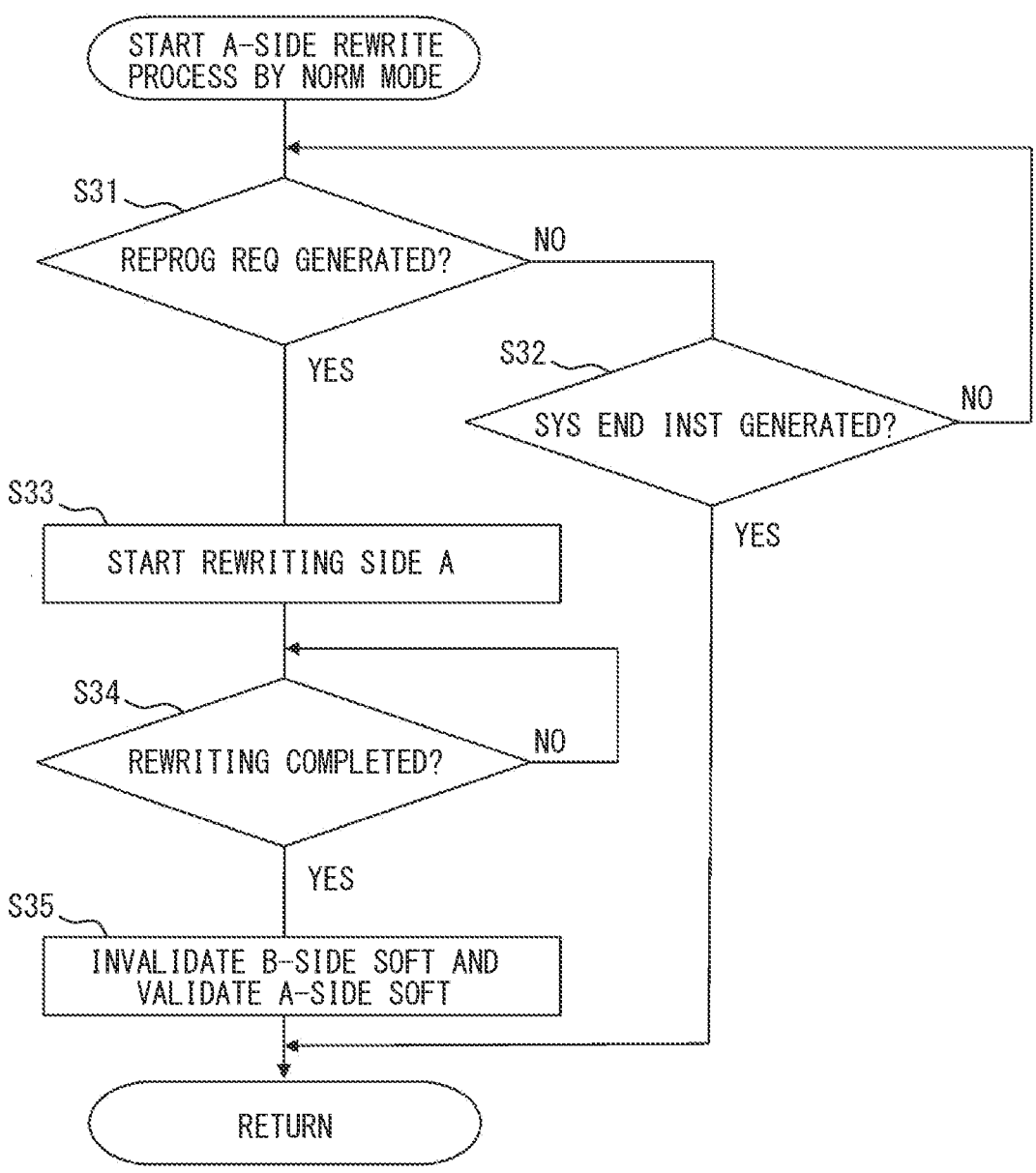
FIG. 10 is a flowchart showing processing at system activation.
Figure 11:
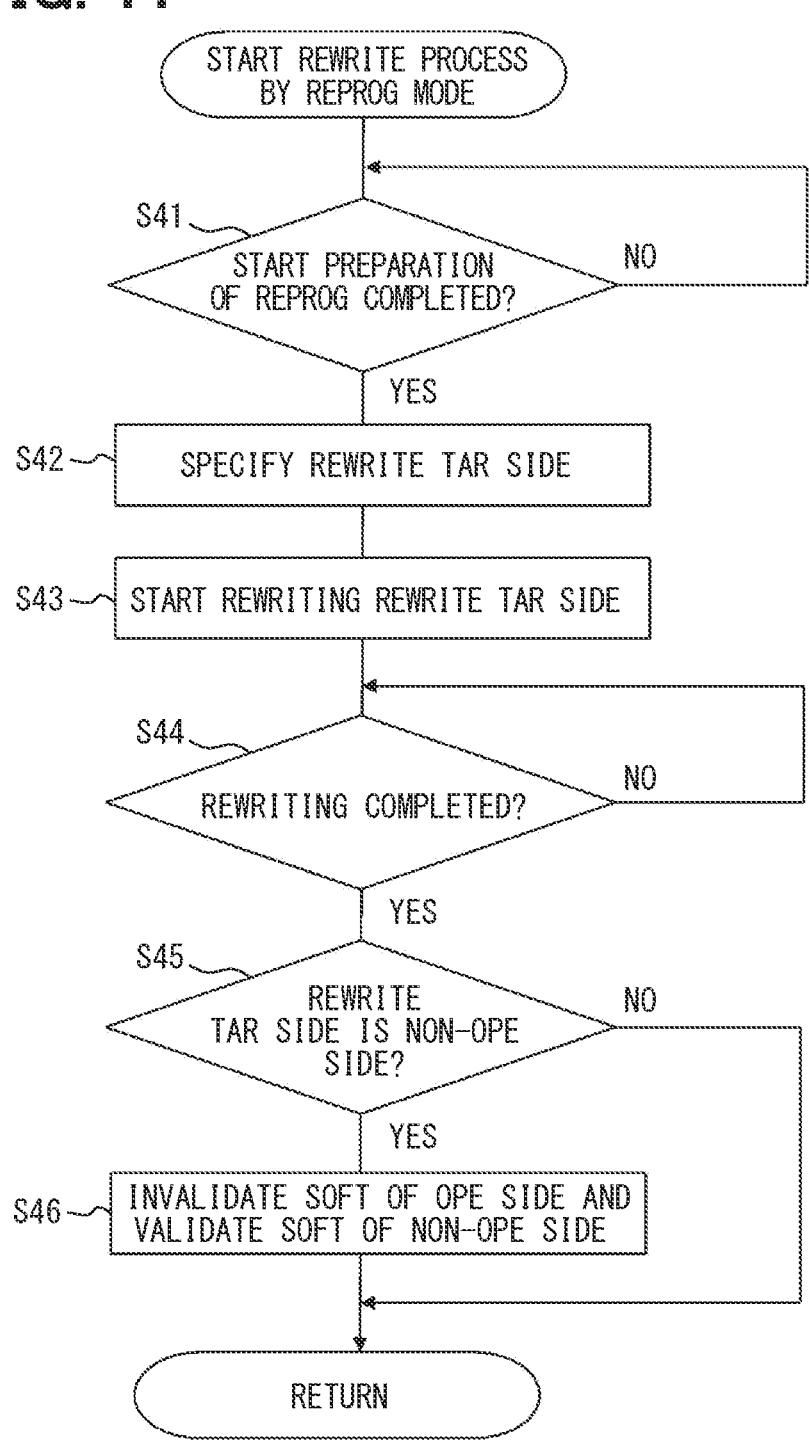
FIG. 11 is a flowchart showing processing at system activation.

When the reprogram software flag is on, as shown in FIG. 6, the control unit 5 notifies the storage 6 of a request to load the reprogram mode reprogram software, loads the reprogram mode reprogram software from the storage 6, and expands it on the RAM, and activates with the reprogram mode reprogram software. The control unit 5 executes the reprogram mode reprogram software expanded on the RAM to be capable of writing the reprogram software flag, and reading and writing the boot flag.

When activated by the reprogram mode reprogram software, the control unit 5 updates the reprogram software flag according to the reprogram progress by the reprogram mode reprogram software, as shown in FIG. 7. When a transition request to the reprogram mode is generated, the control unit 5 maintains the off state of the reprogram software flag until the transition request to the reprogram mode is completed. When the request for transition to the reprogram mode is completed, the control unit 5 updates the reprogram software flag from the off state to the on state, and maintains the on state of the reprogram software flag until the rewriting of the software on either side A or side B is completed. When the rewriting of the software of either the A side or the B side is completed, the control unit 5 updates the reprogram software flag from the on state to the off state. When the reprogram software flag is updated from the on state to the off state, the control unit 5 activates the system with either the A-side normal software or the B-side normal software when the system is re-activated.

That is, when a request to transition to the reprogram mode is generated, the control unit 5 maintains the off state of the reprogram software flag until the request to transition to the reprogram mode is completed, thereby activating with either A-side normal software or B-side normal software if a power source failure occurs during the activation of either A-side normal software or B-side normal software, and the system is re-activated due to the power source recovery. When the request for transition to the reprogram mode is completed, the control unit 5 maintains the on state of the reprogram software flag until the rewriting of either A-side or B-side is completed, thereby activating with the reprogram mode reprogram software if a power source failure occurs during the rewriting of either A-side or B-side, and the system is re-activated due to the power source recovery. When the rewriting of either the A side or the B side is completed, the control unit 5 updates the reprogram software flag from the on state to the off state, so that the control unit 5 activates the system with the A-side normal software or the B-side normal software if a power source failure occurs after the rewriting of either A-side or B-side is completed and the system is re-activated due to the power source recovery.

A function of the configuration will be described with reference to FIGS. 8 to 12. As the processing executed by the control unit 5, the processing at the time of system activation and the reprogram mode transition request determination processing will be sequentially described.

(1) System Activation Processing (See FIGS. 8 to 11)

For example, when the start condition of the system activation process is established by turning on the power source, the control unit 5 starts the system activation process and activates the IPL (at S1). The control unit 5 refers to the reprogram software flag and determines whether or not the reprogram software flag is on (at S2). When the control unit 5 determines that the reprogram software flag is not on but off ("NO" at S2), it refers to the boot flag and determines whether or not the boot flag is on (at S3).

When the control unit 5 determines that the boot flag is on ("YES" at S3), it notifies the storage 6 of a request to load the reprogram mode transition software and the normal activation reprogram software included in the A-side normal software, and loads the reprogram mode transition software and the normal activation reprogram software included in the A-side normal software from the storage 6 and expands on the RAM (at S4). The control unit 5 activates the reprogram mode transition software and the normal activation reprogram software (at S5, which corresponds to the activation procedure), and shifts to the B-side rewriting process in the normal mode (at S6).

When the B-side rewriting process in the normal mode is started, the control unit 5 determines whether a reprogram request has been generated (at S21) and determines whether a system termination instruction has been generated (at S22). When the control unit 5 determines that a reprogram request has been generated ("YES" at S21), it starts rewriting the B side (at S23), and determines whether or not the rewriting of the B side has been completed (at S24). When the control unit 5 determines that the rewriting of the B side has been completed ("YES" at S24), it updates the boot flag from the on state to the off state, invalidates the software on the A side, and validates the software on the B side (at A25, corresponding to an information update procedure), and terminates the B-side rewriting process in the normal mode. Then, it returns to the system activation process, and the system activation process ends. When the control unit 5 determines that a system termination instruction has been generated ("YES" at S22), the control unit 5 terminates the rewriting process of the B side in the normal mode without starting the rewriting of the B side, returns to the system activation process, and performs the system activation process.

When the control unit 5 determines that the boot flag is not on but off ("NO" at S3), it notifies the storage 6 of a request to load the reprogram mode transition software and the normal activation reprogram software included in the B-side normal software, and loads the reprogram mode transition software and the normal activation reprogram software included in the B-side normal software from the storage 6 and expands on the RAM (at S7). The control unit 5 activates the reprogram mode transition software and the normal activation reprogram software (at S8, which corresponds to the activation procedure), and shifts to the A-side rewriting process in the normal mode (at S9).

When the A-side rewriting process in the normal mode is started, the control unit 5 determines whether a reprogram request has been generated (at S31) and determines whether a system termination instruction has been generated (at S32). When the control unit 5 determines that a reprogram request has been generated ("YES" at S31), it starts rewriting the A side (at S33), and determines whether or not the rewriting of the A side has been completed (at S34). When the control unit 5 determines that the rewriting of the A side has been completed ("YES" at S34), it updates the boot flag from the off state to the on state, invalidates the software on the B side, and validates the software on the A side (at A35, corresponding to an information update procedure), and terminates the A-side rewriting process in the normal mode. Then, it returns to the system activation process, and the system activation process ends. When the control unit 5 determines that a system termination instruction has been generated ("YES" at S32), the control unit 5 terminates the rewriting process of the B side in the normal mode without starting the rewriting of the A side, returns to the system activation process, and performs the system activation process.

On the other hand, when the control unit 5 determines that the reprogram software flag is on ("YES" at S2), it notifies the storage 6 of a request to load the reprogram mode reprogram software, loads the reprogram mode reprogram software from the storage 6, and expands it on the RAM. (at S10). The control unit 5 activates the reprogram mode reprogram software (at S11, which corresponds to the activation procedure), and shifts to rewriting process in the reprogram mode (at S12).

When the rewriting process in the reprogram mode is started, the control unit 5 determines whether or not preparations for starting the reprogram are completed (at S41). When the control unit 5 determines that preparations for starting the reprogram have been completed ("YES" at S41), it refers to the boot flag and specifies which of the A side and the B side is the rewriting target side (at S42). When the control unit 5 determines that the boot flag is on, it specifies the side A as the rewriting target side, and when it determines that the boot flag is off, it specifies the side B as the rewriting target side.

The control unit 5 starts rewriting of the specified rewriting target side (at S43), and determines whether the rewriting of the rewriting target side is completed (at S44). When the control unit 5 determines that the rewriting of the rewriting target side is completed ("YES" at S44), it determines whether the rewriting target side for which the rewriting of the software has been completed is a non-operating side (at S45).

When the control unit 5 determines that the rewriting target side for which the rewriting of the software has been completed is not the non-operating side but the operating side ("NO" at S45), the control unit 5 terminates the rewriting process in the reprogram mode and returns to the system activation process. When the control unit 5 determines that the rewriting target side for which the rewriting of the software has been completed is the non-operating side ("YES" at S45), it updates the on and off state of the boot flag, invalidates the software on the operating side, and validates the software on the non-operating side (at A46, corresponding to information update procedure), the rewriting process in the reprogram mode is terminated, it returns to the system activation process, and the system activation process ends.

Figure 12:
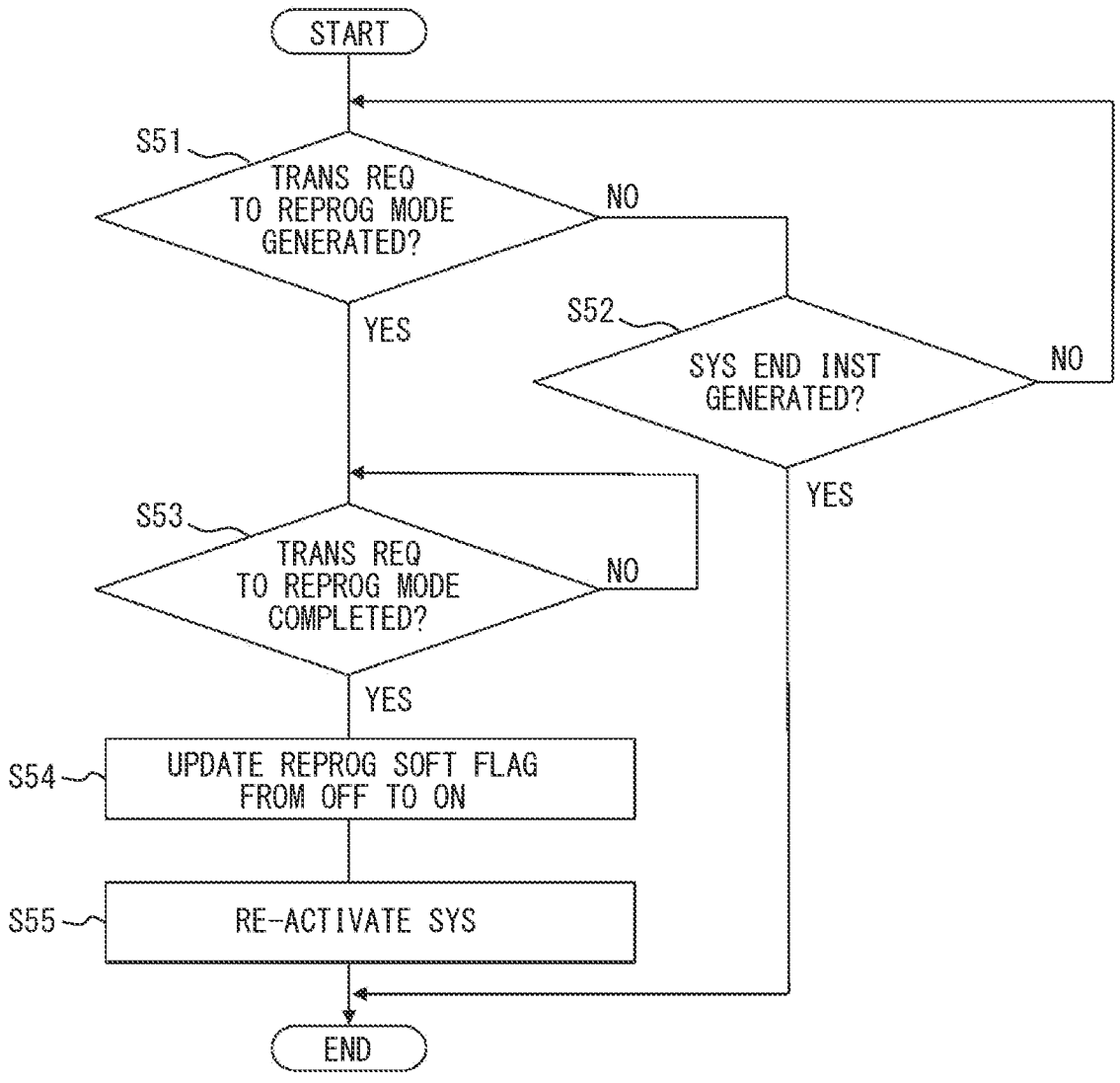
FIG. 12 is a flowchart showing a reprogram mode transition request determination process.

(2) Reprogram Mode Transition Request Determination Process (See FIG. 12)

The control unit 5 executes the reprogram mode transition request determination process by executing the reprogram mode transition software. When the reprogram mode transition request determination process is started, the control unit 5 determines whether a transition request to the reprogram mode has been generated (at S51) and determines whether a system termination instruction has been generated (at S52). When the control unit 5 determines that a request to transition to the reprogram mode has been generated ("YES2 at S51), it determines whether the request to transition to the reprogram mode has been completed (at S53). When the control unit 5 determines that the transition request to the reprogram mode has been completed ("YES" at S53), it updates the reprogram software flag from the off state to the on state (at S54, corresponding to an information update procedure), and reactivates the system (at S55), and the reprogram mode transition request determination process is terminated. When the control unit 5 determines that the system termination instruction has been generated ("YES" at S52), the reprogram mode transition request determination process is terminated without updating the reprogram software flag from the off state to the on state. When the system is reactivated in step S55 after updating the reprogram software flag from the off state to the on state in step S54, the control unit 5 proceeds to step S2 as described with reference to FIG. 8, and determines that the reprogram software flag is on, and notifies the storage 6 of a request for loading the reprogram mode reprogram software.

The first embodiment described above can provide the following effects. In the ECU 1, the reprogram software flag and the boot flag are updated according to the progress of the reprogram, and the system is activated based on the reprogram software flag and the boot flag. Even if a power source failure occurs during the execution of the reprogramming, the system can be reactivated normally by referring to the reprogram software flag and the boot flag immediately before the power source failure occurs when the system is re-activated since the power source is recovered. As a result, even if a power source failure occurs during the execution of the reprogramming, the system can be reactivated normally when the system is reactivated by the power source recovery.

In the ECU 1, when a reprogram request in the normal mode is generated during activation in the normal mode, the non-operating side is rewritten, and the boot flag is updated after the rewriting of the non-operating side is completed. When the system is reactivated, the software on the rewriting completed side can be activated.

In an ECU 1, when a request for transition to a reprogram mode occurs during activation in a normal mode, a reprogram software flag is updated after the transition to the reprogram mode is completed, and the system is reactivated after updating the reprogram soft flag. When the system is reactivated, it can be activated in reprogram mode.

In the ECU 1, when the non-operating side is rewritten during activation in the reprogram mode, the boot flag is updated after the rewriting is completed. When the system is reactivated, the software on the rewriting completed side can be activated.

In the above-described embodiment, the software stored in the software storage area 8 of the storage 6 of the ECU 1 is updated. Alternatively, the reprogram target may not be limited to the ECU 1, but may be the master ECU itself which manages integrally the ECU 1. As shown in FIG. 13, the master ECU 21 includes a control unit 22 and a storage 23 as a storage medium. The control unit 22 includes a reprogram progress management unit 24, a flag update unit 25 and an integration management unit 26. The integration management unit 26 issues operation instructions to the ECU 1 and acquires operation states from the ECU 1. In addition, the integration management unit 16 instructs the master ECU 3 itself and acquires the operating state of the master ECU 3. The storage 23 has a flag storage area 27 and a software storage area 28. The flag storage area 27 is equivalent to the flag storage area 7 described above, and includes a reprogram software flag storage area 29 and a boot flag storage area 30. The software storage area 28 is equivalent to the software storage area 8 described above, and includes an A-side normal software storage area 31, a B-side normal software storage area 32, and a reprogram mode reprogram software storage area 33.

The master ECU 21 is connected to the DCM 4 functioning as a data communication device. When receiving the distribution package transmitted from the OTA center, the DCM 4 transmits the received distribution package to the master ECU 21. When the delivery package is transmitted from the DCM 4, the master ECU 21 extracts update data from the transmitted delivery package and executes writing the extracted update data.

According to such a configuration, the master ECU 21 that integrally manages the ECU 1 updates the reprogram software flag and the boot flag according to the progress of the reprogramming, and activates the system based on the reprogram software flag and the boot flag. Even if a power source failure occurs during the execution of the reprogramming, the system can be reactivated normally by referring to the reprogram software flag and the boot flag immediately before the power source failure occurs when the system is re-activated since the power source is recovered. As a result, even if a power source failure occurs during the execution of the reprogramming, the system can be reactivated normally when the system is reactivated by the power source recovery.

Second Embodiment

A second embodiment will be described with reference to FIG. 14 to FIG. 15. The second embodiment has a configuration including a plurality of storages. The ECU 41 includes a control unit 42, a first storage 43 and a second storage 44. The control unit 42 includes a reprogram progress management unit and a flag update unit, like the control unit 5 described in the first embodiment. The first storage 43 has a flag storage area 7 and a software storage area 45. The software storage area 45 includes an A-side normal software storage area 46, a B-side normal software storage area 47, and a reprogram mode reprogram software storage area 48. The second storage 44 has a software storage area 49. The software storage area 49 includes an A-side normal software storage area 50 and a B-side normal software storage area 51. The A-side normal software stored in the normal software storage area 46 for side A of the first storage 43 and the A-side normal software stored in the normal software storage area 50 for side A of the second storage 44 may be the software that implements one application in cooperation with each other, or software that implements separate applications. The B-side normal software stored in the normal software storage area 47 for side B of the first storage 43 and the B-side normal software stored in the normal software storage area 51 for side B of the second storage 44 may be the software that implements one application in cooperation with each other, or software that implements separate applications.

Figure 14:
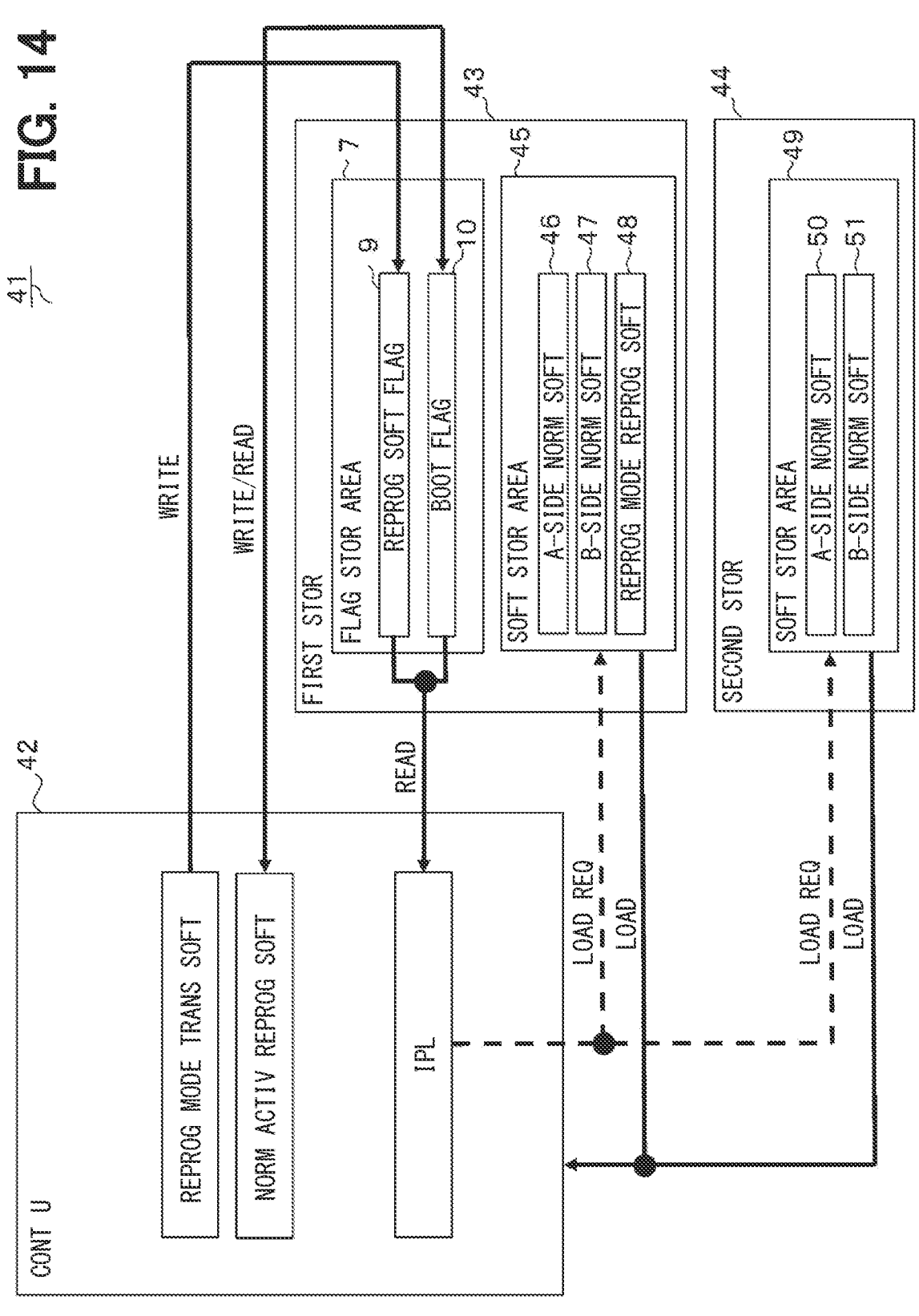
FIG. 14 is a diagram showing a second embodiment and explaining an activation in a normal mode.

As shown in FIG. 14, when the reprogram software flag is off and the boot flag is on, the control unit 42 notifies the load request for the reprogram mode transition software and the normal activation reprogram software included in the A-side normal software to the first storage 43 and the second storage 44, loads the reprogram mode transition software and the normal activation reprogram software included in the A-side normal software from the first storage 43 and the second storage 44 to expand on the RAM, and activates with the A-side normal software.

When the reprogram software flag is off and the boot flag is off, the control unit 42 notifies the load request for the reprogram mode transition software and the normal activation reprogram software included in the B-side normal software to the first storage 43 and the second storage 44, loads the reprogram mode transition software and the normal activation reprogram software included in the B-side normal software from the first storage 43 and the second storage 44 to expand on the RAM, and activates with the B-side normal software.

Figure 15:
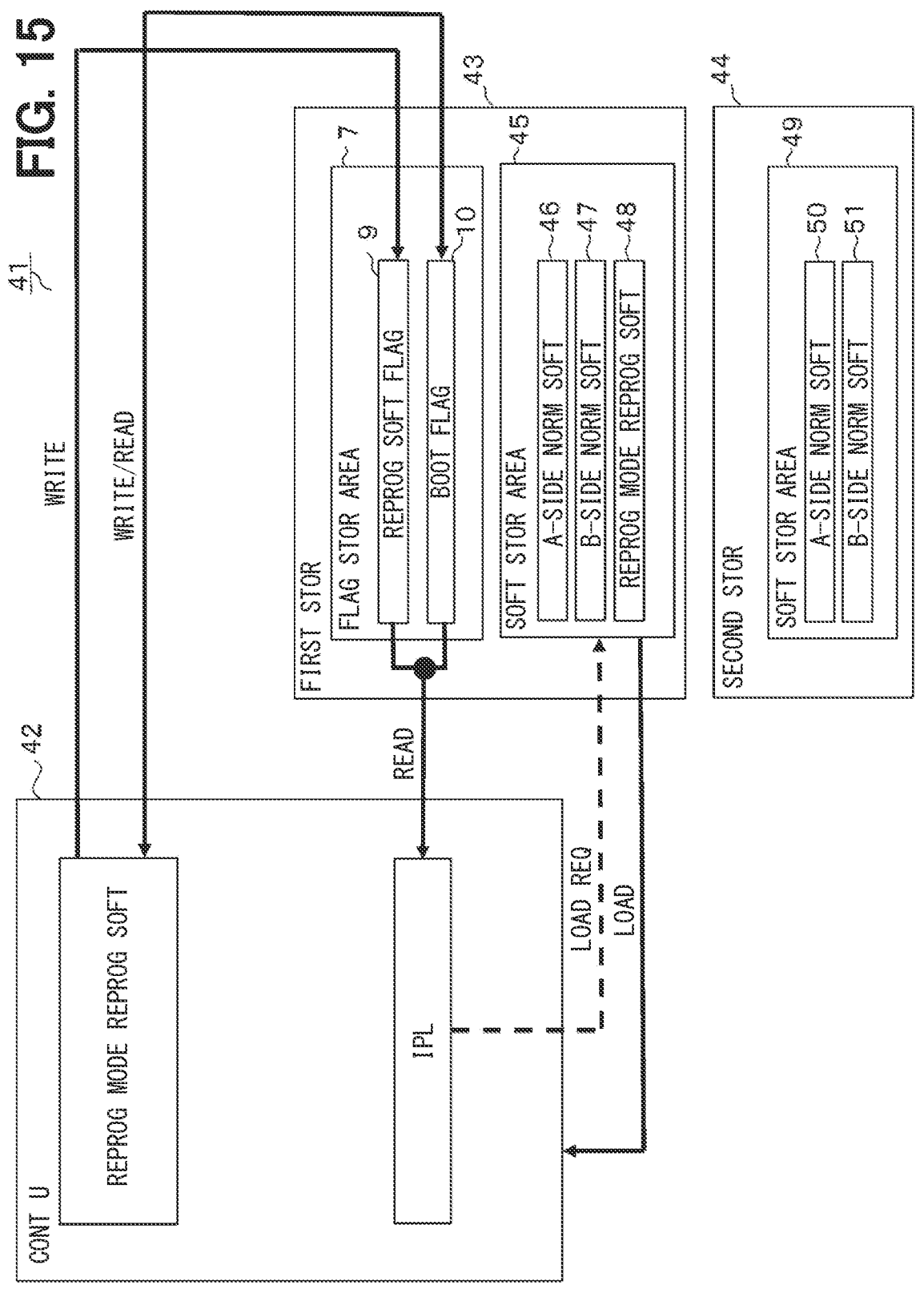
FIG. 15 is a diagram for explaining an activation in a reprogram mode.

When the reprogram software flag is on, as shown in FIG. 15, the control unit 42 notifies the first storage 43 of a request to load the reprogram mode reprogram software, loads the reprogram mode reprogram software from the first storage 43, and expands it on the RAM, and activates with the reprogram mode reprogram software.

In the second embodiment, the arrangement of software differs from that in the first embodiment, and the control unit 42 performs the same processes as the system activation process and the reprogram mode transition request determination process described in the first embodiment. In addition, although the configuration provided with the two storages 43 and 44 has been exemplified above, the same applies to the configuration provided with three or more storages.

As described above, according to the second embodiment, even in a configuration including a plurality of storages 43 and 44, it is possible to obtain the same effects as in the first embodiment, and the system can be activated normally when the system is re-activated due to the power source recovery even if the power source failure occurs during the execution of the reprogram.

Third Embodiment

A third embodiment will be described with reference to FIG. 16 to FIG. 17. In the first embodiment, one storage is provided with a plurality of software storage areas for the same side. The software for the same side is classified by core unit or virtual machine unit. The ECU 61 includes a control unit 62 and a storage 63. The control unit 62 includes a reprogram progress management unit and a flag update unit, like the control unit 5 described in the first embodiment. The storage 63 has a flag storage area 7 and a software storage area 64. The software storage area 64 includes a first A side normal software storage area 65, a first B side normal software storage area 66, a second A side normal software storage area 67, a second B side normal software storage area 68, and a reprogram mode reprogram software storage area 69.

Figure 16:
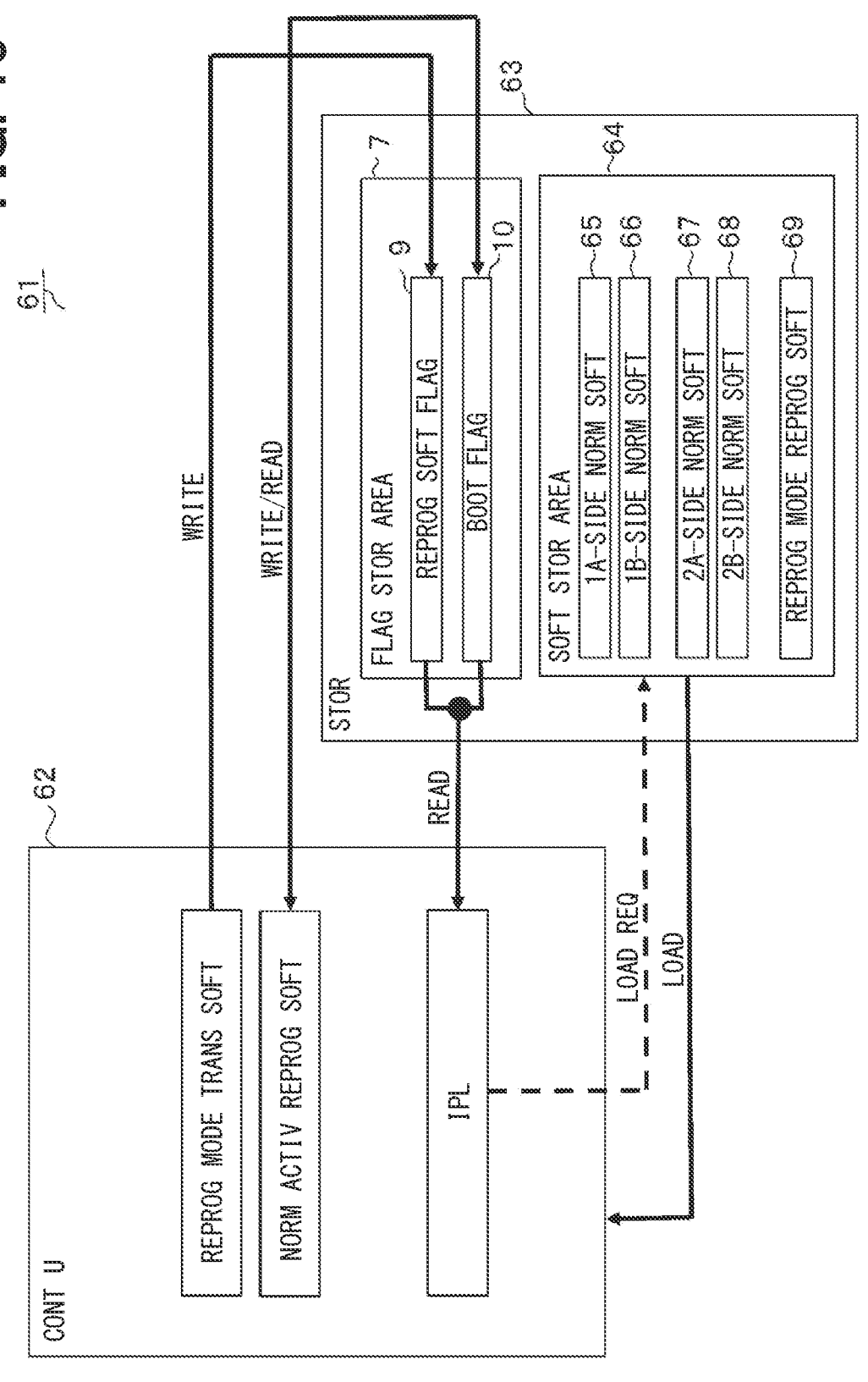
FIG. 16 is a diagram showing a third embodiment and explaining an activation in a normal mode.

As shown in FIG. 16, when the reprogram software flag is off and the boot flag is on, the control unit 62 notifies the load request for the reprogram mode transition software and the normal activation reprogram software included in the A-side normal software to the storage 63, loads the reprogram mode transition software and the normal activation reprogram software included in the first A-side normal software and the second A-side normal software from the storage 63 to expand on the RAM, and activates with the first A-side normal software and the second A-side normal software.

When the reprogram software flag is off and the boot flag is off, the control unit 62 notifies the load request for the reprogram mode transition software and the normal activation reprogram software included in the B-side normal software to the storage 63, loads the reprogram mode transition software and the normal activation reprogram software included in the first B-side normal software and the second B-side normal software from the storage 63 to expand on the RAM, and activates with the first B-side normal software and the second B-side normal software.

Figure 17:
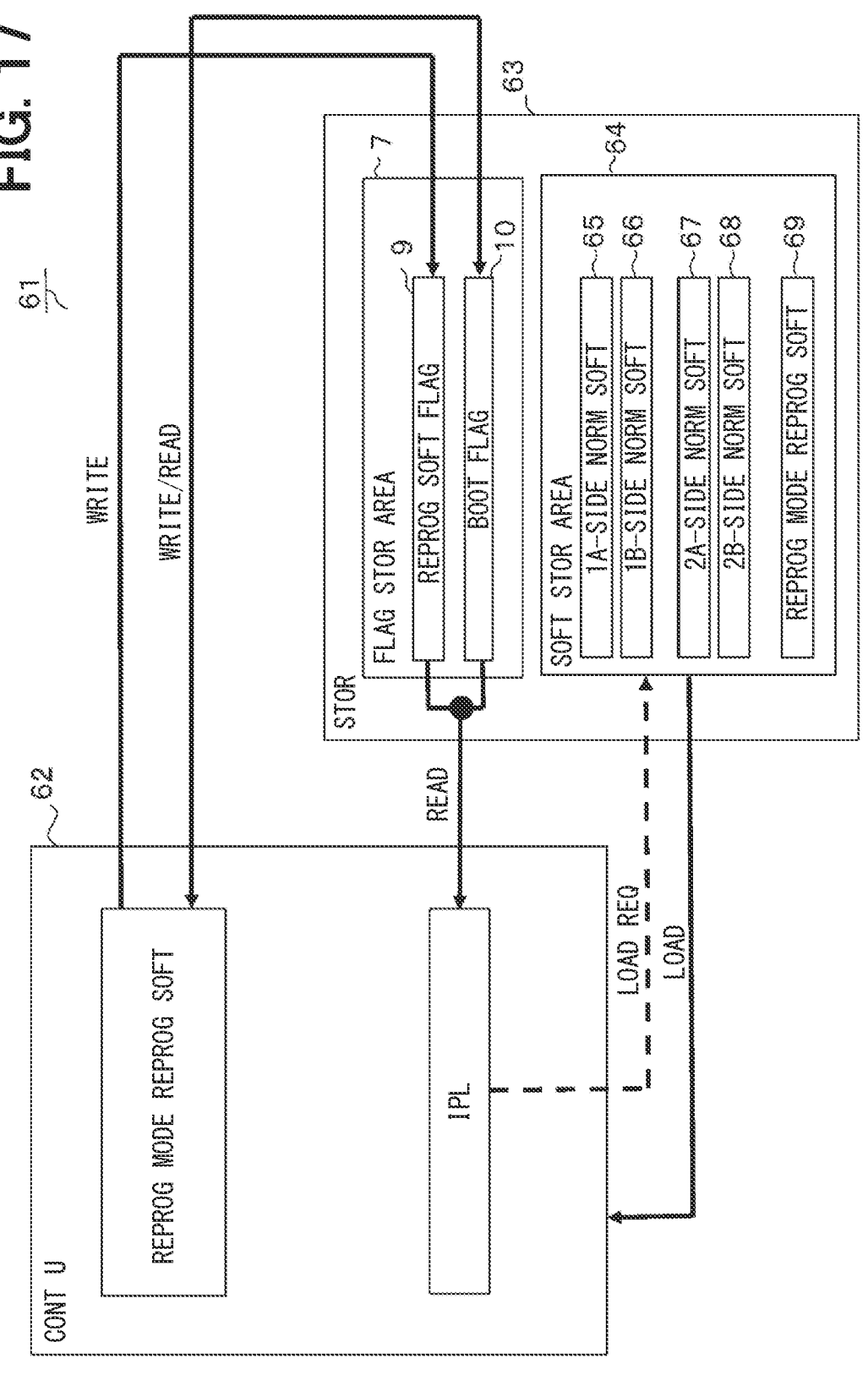
FIG. 17 is a diagram for explaining an activation in a reprogram mode.

When the reprogram software flag is on, as shown in FIG. 17, the control unit 62 notifies the storage 63 of a request to load the reprogram mode reprogram software, loads the reprogram mode reprogram software from the storage 63, and expands it on the RAM, and activates with the reprogram mode reprogram software.

In the third embodiment, the arrangement of software differs from that in the first embodiment, and the control unit 62 performs the same processes as the system activation process and the reprogram mode transition request determination process described in the first embodiment. In the above, the configuration having two software storage areas for the same side has been exemplified, but the same applies to the configuration having three or more software storage areas for the same side.

As described above, according to the third embodiment, even in a configuration in which a single storage 63 is provided with a plurality of software storage areas for the same side, it is possible to obtain the same effects as in the first embodiment. Even if a power source failure occurs during execution of the reprogram, the system can be reactivated normally when the power source is reactivated due to the power source recovery.

Other Embodiments

While the present disclosure has been described based on the embodiments, the present disclosure is not limited to the embodiment or structure described herein. The present disclosure includes various modification examples or variations within the scope of equivalents. Furthermore, various combinations and formations, and other combinations and formations including one, more than one or less than one element may be included in the scope and the spirit of the present disclosure.

In the above-described embodiment, the configuration in which the reprogram target ECU has a plurality of software areas has been described, but the configuration can also be applied to the configuration in which the reprogram target ECU has a single software area. In the case of a reprogram target ECU that has the software area o the single side, the boot flag storage area 10 may be deleted or the boot flag may be set to a fixed value. The operation based on the reprogram software flag is as described in the above embodiment.

In a reprogram target ECU having a software area on one side, if a power source failure occurs during the execution of the reprogramming, the system may not be activated in the mode that requires to be activated. That is, there may be a possibility that the system cannot be reactivated normally when the system is reactivated by the power source recovery. The activation mode information storage unit stores the activation mode information indicating whether a system is activated in a normal mode or a reprogram mode when the system is activated. The reprogram progress management unit manages the progress of the reprogram. The information update unit updates the activation mode information according to the progress of the reprogramming. The reprogram progress management unit activates the system based on the activation mode information.

The activation mode information is updated according to the progress of the reprogramming, and the system is activated based on the activation mode information. Even if a power source failure occurs during the execution of the reprogramming, the system can be re-activated normally by referring to the activation mode information immediately before the power source failure when the system is reactivated due to the power source recovery. As a result, even if a power source failure occurs during the execution of the reprogramming, the system can be reactivated normally when the system is reactivated by the power source recovery.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the controller and the method thereof described in the present disclosure may be implemented by one or more dedicated computers configured by a combination of a processor and a memory programmed to execute one or more functions and a processor configured by one or more hardware logic circuits. The computer program may also be stored on a computer readable and non-transitory tangible recording medium as instructions executed by a computer.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control device having a software area with a plurality of sides for storing software, the electronic control device comprising:

an activation mode information storage unit that stores activation mode information indicating whether a system is activated in a normal mode or a reprogram mode when the system is activated;

an activation side information storage unit that stores activation side information indicating with which one of the plurality of sides is activated when the system is activating in the normal mode;

a reprogram progress management unit that manages a progress of a reprogram; and an information update unit that updates at least one of the activation mode information and the activation side information according to the progress of the reprogram, wherein:

the reprogram progress management unit activates the system based on the activation mode information and the activation side information.

2. The electronic control device according to claim 1, wherein:

the reprogram progress management unit activates the system either in the normal mode or the reprogram mode based on the activation mode information, and determines an activation side based on the activation side information when activated in the normal mode.

3. The electronic control device according to claim 1, wherein:

the reprogram progress management unit rewrites a non-operating side when a request for the reprogram in the normal mode occurs during an activation in the normal mode; and the information update unit updates the activation side information after rewriting of the non-operating side is completed.

4. The electronic control device according to claim 1, wherein:

when a request to transition to the reprogram mode is generated during the reprogram progress management unit activates the system in the normal mode, the information update unit updates the activation mode information after the transition to the reprogram mode is completed; and the reprogram progress management unit re-activates the system after updating the activation mode information.

5. The electronic control device according to claim 1, wherein:

when the reprogram progress management unit rewrites a non-operating side while the reprogram progress management unit activates the system in the reprogram mode, the information update unit updates an operating side information after completing rewriting of the non-operating side.

6. The electronic control device according to claim 1, further comprising:

one or more processors, wherein:

the one or more processors provides at least one of: the activation mode information storage unit; the activation side information storage unit; the reprogram progress management unit; and the information update unit.

7. A reprogram execution method for a control unit in an electronic control device having: an activation mode information storage unit that has a software area with a plurality of sides for storing software and stores activation mode information indicating whether a system is activated in a normal mode or a reprogram mode when the system is activated; and an activation side information storage unit that stores activation side information indicating with which one of the plurality of sides is activated when the system is activating in the normal mode, the reprogram execution method comprising:

an information updating procedure for updating at least one of the activation mode information and the activation side information according to a progress of reprogram; and an activation procedure for activating the system based on the activation mode information and the activation side information.

8. A non-transitory tangible computer readable storage medium comprising instructions being executed by a computer, the instructions causing a control unit in an electronic control device having: an activation mode information storage unit that has a software area with a plurality of sides for storing software and stores activation mode information indicating whether a system is activated in a normal mode or a reprogram mode when the system is activated; and an activation side information storage unit that stores activation side information indicating with which one of the plurality of sides is activated when the system is activating in the normal mode, to execute:

an information updating procedure for updating at least one of the activation mode information and the activation side information according to a progress of reprogram; and an activation procedure for activating the system based on the activation mode information and the activation side information.

* * * * *